(No Model.)

J. T. McKOY, Jr.
ANIMAL POKE.

No. 354,608. Patented Dec. 21, 1886.

Witnesses
Wm. J. Pannes
A. W. Brecht

Inventor
John T. McKoy, Jr.
By Attorney F. A. Lehmann

UNITED STATES PATENT OFFICE.

JOHN T. McKOY, JR., OF NEWNAN, GEORGIA.

ANIMAL-POKE.

SPECIFICATION forming part of Letters Patent No. 354,608, dated December 21, 1886.

Application filed October 14, 1886. Serial No. 216,272. (No model.)

*To all whom it may concern:*

Be it known that I, JOHN T. McKOY, Jr., of Newnan, in the county of Coweta and State of Georgia, have invented certain new and useful Improvements in Animal-Pokes; and I do hereby declare the following to be a full, clear, and exact description of the invention, such as will enable others skilled in the art to which it pertains to make and use it, reference being had to the accompanying drawings, which form part of this specification.

My invention relates to an improvement in animal-pokes; and it consists in a poke which is composed of two or more parts which telescope, as will be more fully described hereinafter.

The object of my invention is to provide an animal-poke which will telescope or shorten in length when the animal's head is near the ground, and thus allow it to freely graze, but which poke, when the animal raises its head, automatically lengthens, so as to prevent the animal from approaching a fence.

Figure 1:
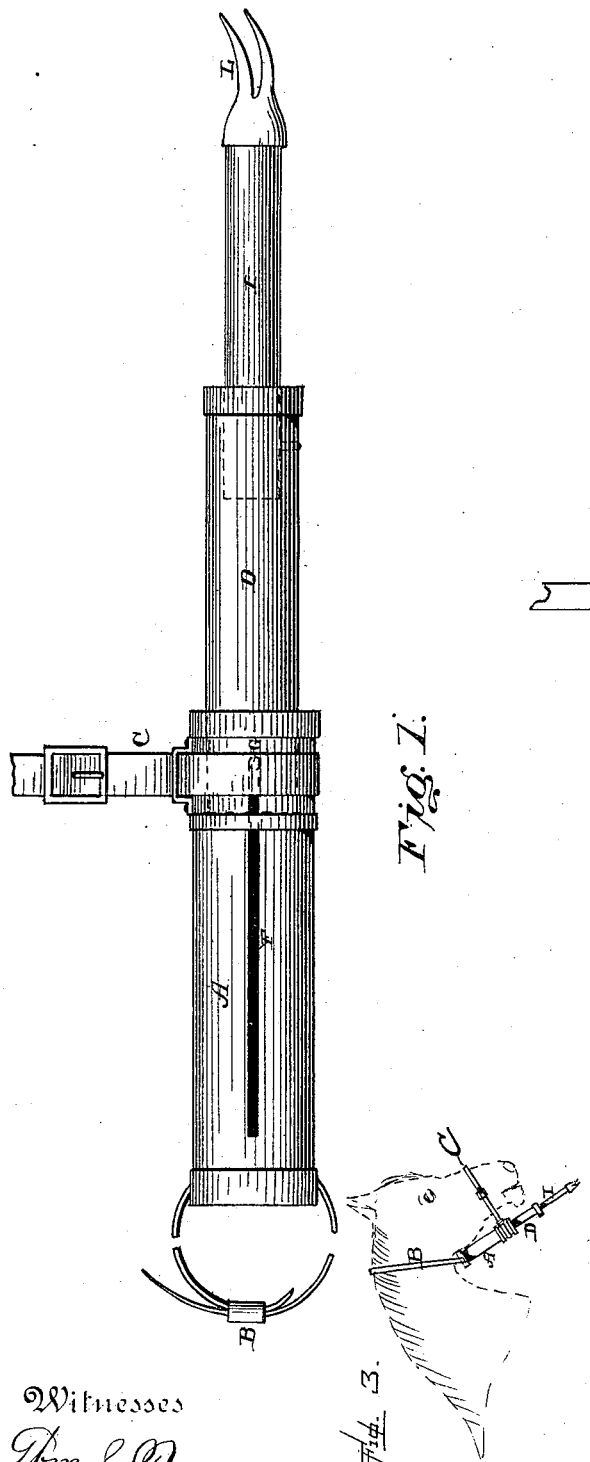
Figure 2:
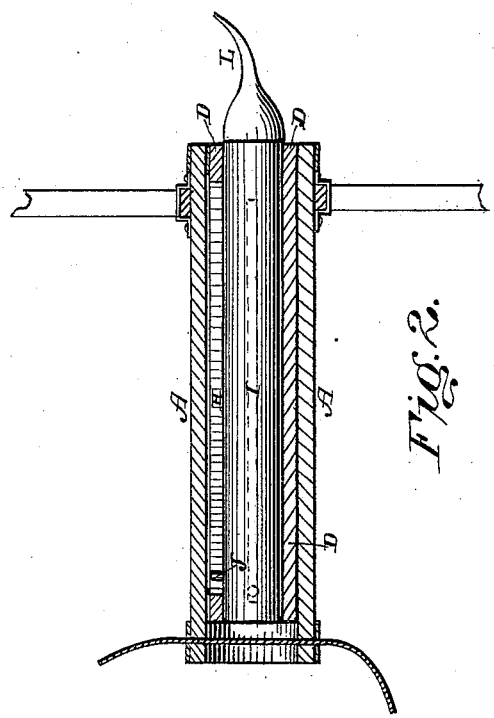
Figure 3:
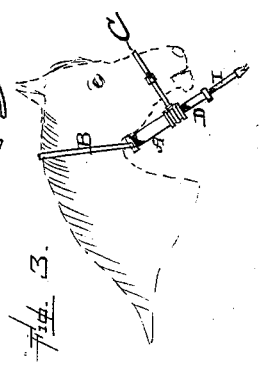

Figure 1 is a side elevation of a poke embodying my invention, the parts being extended. Fig. 2 is a vertical section of the same, the parts being shown as telescoped. Fig. 3 represents the poke in position upon an animal's head.

A represents the upper tubular section, which is fastened under the animal's jaw by a strap, B, which passes around its neck, and by a second strap, C, which passes up over the top of the nose. Sliding freely in this part A is a second tubular part, D, which is provided with a projection, G, which passes through a slot, F, which is made in the section A, and which serves to prevent the section D from turning around within the one A. The section D slides freely back and forth through the one A the full length of the slot F, but has no other than an endwise movement.

Placed inside of the second tubular section, D, which is provided with a longitudinal slot, H, is the third solid section, I, which is provided with a projection, J, near its upper end to catch in the slot, and with a hook, L, upon its lower end. This hook is intended to catch against fences, and thus prevent the animal from approaching sufficiently near to jump over. As it is intended to always have this hook project toward the front, the sections are provided with slots and projections for the purpose of preventing them from turning around. These three sections slide freely back and forth as the animal raises or lowers its head, and when closed are short enough not to interfere with the animal freely grazing. As soon as the animal lifts its head the two sliding sections slip out from their own gravity, and hence project sufficiently beyond the animal's head to prevent it from getting near the fence. When the animal lowers its head to the ground, the pressure of the hook upon the ground causes the two sections to slide up into the upper one, A, where they remain all the time the animal is grazing.

Having thus described my invention, I claim—

1. An animal-poke composed of a tubular section, A, and sliding sections which telescope into said tubular section, in combination with means for attaching the poke to the animal's head, substantially as described.

2. In an animal-poke, the combination of the two tubular sections A D, provided with slots, and the lower solid section, I, the two sections D I being provided with projections to catch in the slots, and straps to fasten the poke to the animal's head, substantially as set forth.

In testimony whereof I affix my signature in presence of two witnesses.

JOHN T. McKOY, JR.

Witnesses:
W. R. BALLARD,
R. W. FREEMAN.